United States Patent [19]

Ashberg

[11] Patent Number: 4,786,115
[45] Date of Patent: Nov. 22, 1988

[54] WHEEL BEARING UNIT FOR REAR WHEEL DRIVE

[75] Inventor: Sture Ashberg, Vastra Frolunda, Sweden

[73] Assignee: SKF Nova, Gothenburg, Sweden

[21] Appl. No.: 5,835

[22] Filed: Jan. 21, 1987

[30] Foreign Application Priority Data

Feb. 5, 1986 [SE] Sweden ................................ 8600504

[51] Int. Cl.$^4$ ............................................. F16C 35/00
[52] U.S. Cl. ............................... 301/124 R; 180/259; 384/505; 384/544; 464/906
[58] Field of Search ............... 301/124 R, 124 H, 126, 301/131; 180/258, 259, 73.3, 73.4; 464/178, 182, 906; 384/499, 504–506, 543–544, 589

[56] References Cited

U.S. PATENT DOCUMENTS 4,177,654 12/1979 Aucktor ........................... 464/906 X
4,437,536 3/1984 Colanzi et al. .................. 180/258 X Primary Examiner—Robert B. Reeves
Assistant Examiner—Russell D. Stormer
Attorney, Agent, or Firm—Eugene E. Renz, Jr.

[57] ABSTRACT

The present invention refers to a wheel bearing unit incorporating outer race ring (20), inner race ring (21) and rolling bodies (24) arranged therebetween. The wheel bearing unit according to the invention is intended to carry the driven wheels of a light vehicle. The characterizing for the wheel bearing unit according to the invention is that the inner race ring (21) is provided with an axially projecting portion (28), which is intended for mounting the unit to a drive shaft (30).

7 Claims, 3 Drawing Sheets

WHEEL BEARING UNIT FOR REAR WHEEL DRIVE

FIELD OF THE INVENTION

The present invention refers to a wheel bearing unit, which is intended to support the driven wheels of a light vehicle.

BACKGROUND OF THE INVENTION

Wheel bearing units both for driven and non-driven wheels are known since long and are nowadays used on a plurality of car types. An example of such a unit is shown in the U.S. Pat. No. 3,757,883.

These wheel bearing units can be made in different dimensions. They all have the property of taking up torque load, they have low weight and are easily mounted. The type of wheel bearing units, which is intended for driven frontwheels, usually has a splined central bore for attachment to the journal of the driving joint or it is made integral with such a driving joint.

Most rear-wheel driven cars have a so-called rigid rear shaft. Such a structure incorporates a rigid casing, in which the two drive shafts are supported. Every shaft has an interior support in the differential gearing and an outer bearing at the wheel. This bearing is situated a short distance from the end of the shaft for giving space to the brake mechanism. Characterizing for this structure is that the shaft, beside torsional forces from the drive, will have to absorb also bending forces from the torque loads acting from the road upon the wheel, and it must be dimensioned in relation thereto. With disc brakes at the rear, and the angular accuracy then required, also small deflections of the shaft cause problems.

In FIG. 1 is shown such a known structure, where a rigid rear shaft is supported at its outer end. The very drive shaft is designated 1. This shaft, which has a robust design, is enclosed by a casing 2 and is via a taper bearing 3 supported in this casing, which in turn is suspended in the car. The shaft 1 at one of its ends is provided with a flange 4, to which the rear wheel (not shown) intended to be attached by means of bolts. 5. A brake disc 6 is also attached to this flange 4. This brake disc 6 also incorporates a cylindrical part 7 intended to operate as a brake drum. The disc-shaped part 6 extends through the brake housing 8, and the disc 6 together with the brake housing 8 constitute the main brake.

The drum-shaped part 7 of the brake disc is intended for the parking brake 9, which is actuated by a pull wire 10 or the like.

By using a moment supporting wheel bearing unit, e.g. of the type defined in the abovementioned U.S. Pat. No. 3,757,883, the bending moment is removed from the shaft. This is then dimensioned for rotation only. There will neither be any problem with the brake disc becoming skewed.

Hitherto known bearing units have not been possible to use for driven rear wheels due to the space required by the drum brake equipment. This applies both to drum brake as a main brake and disc brake with drums for the parking brake.

SUMMARY OF THE INVENTION

By the present invention it has however been provided a new type of wheel bearing unit, which fills the requirements which in above mentioned case is put upon such units, i.e. that there shall be space for the brake mechanism and at a disc brake, the position of the brake disc shall not be altered in relation to the brake housing. As to a rigid rear portion it has also been obtained a so called fully floating drive shaft, which means that this, which shall only transfer torque, can be given an essentially smaller dimension.

According to the invention it has thus been provided a wheel bearing unit incorporating outer race ring, inner race ring and rolling bodies provided between these rings, and which is mainly characterized therein that the inner race ring is provided with an axially projecting portion intended for mounting the unit to a drive shaft.

It is appropriate that the projecting portion of the wheel bearing unit is provided with splines, but another design of a rigid connection is also possible. The projecting portion thereby may have a non-round crosssection, such as a triangle, a quadrangle, an ellipse or the like.

The projecting portion of the wheel bearing unit can be made integral with the inner race ring, but it may also be a separate part, which is fixedly connected to the inner race ring.

For giving increased comfort, modern passenger vehicles are often equipped with individual and articulated rear wheel transmissions. The same bearing unit can here be used for giving space to the drum brake mechanism. The projecting portion then is attached to the outer drive joint, or it can be made integral with such a joint.

BRIEF DESCRIPTION OF THE DRAWINGS

The invention hereinafter will be further described with reference to the drawings, in which.

DETAILED DESCRIPTION OF THE PREFERRED EMBODIMENT

Figure 1:
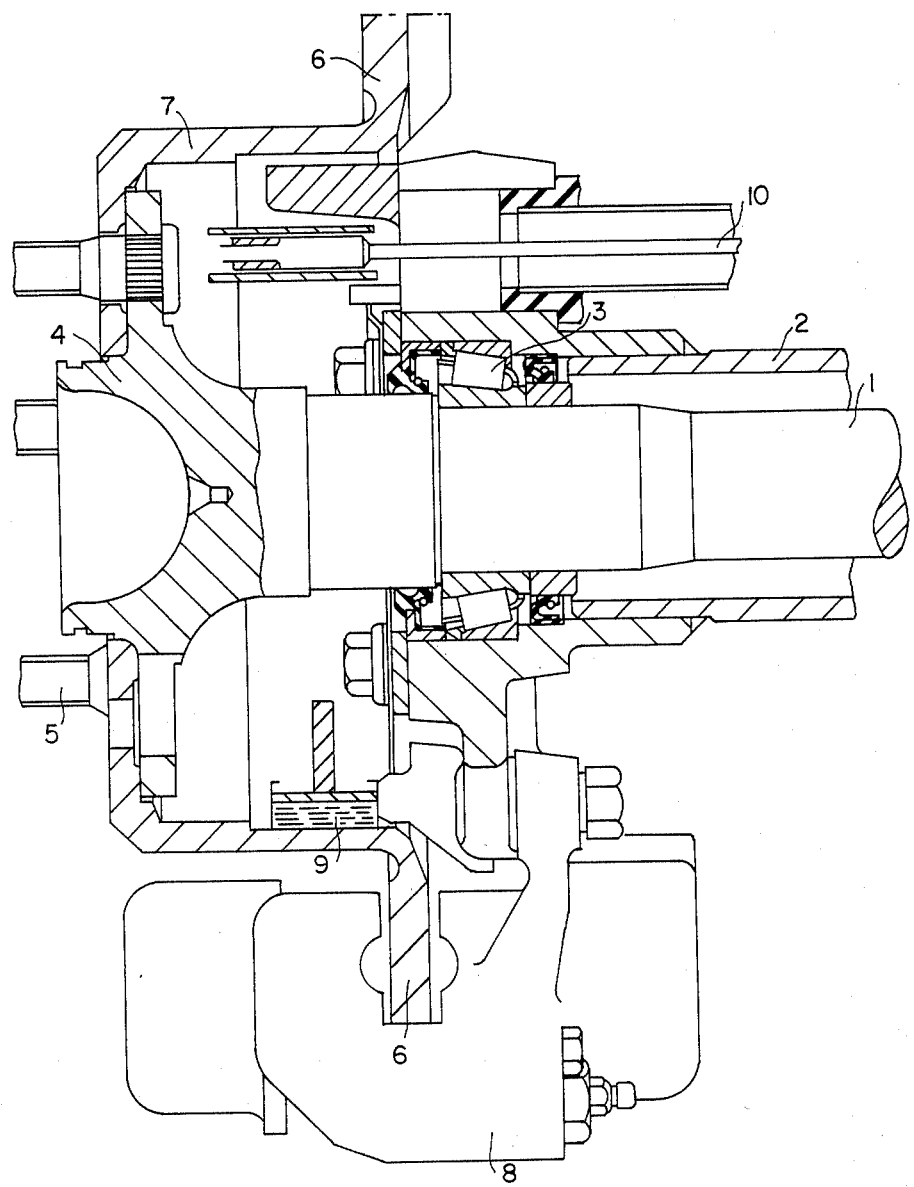
FIG. 1 is a transverse sectional view of a prior art wheel bearing assembly.
Figure 2:
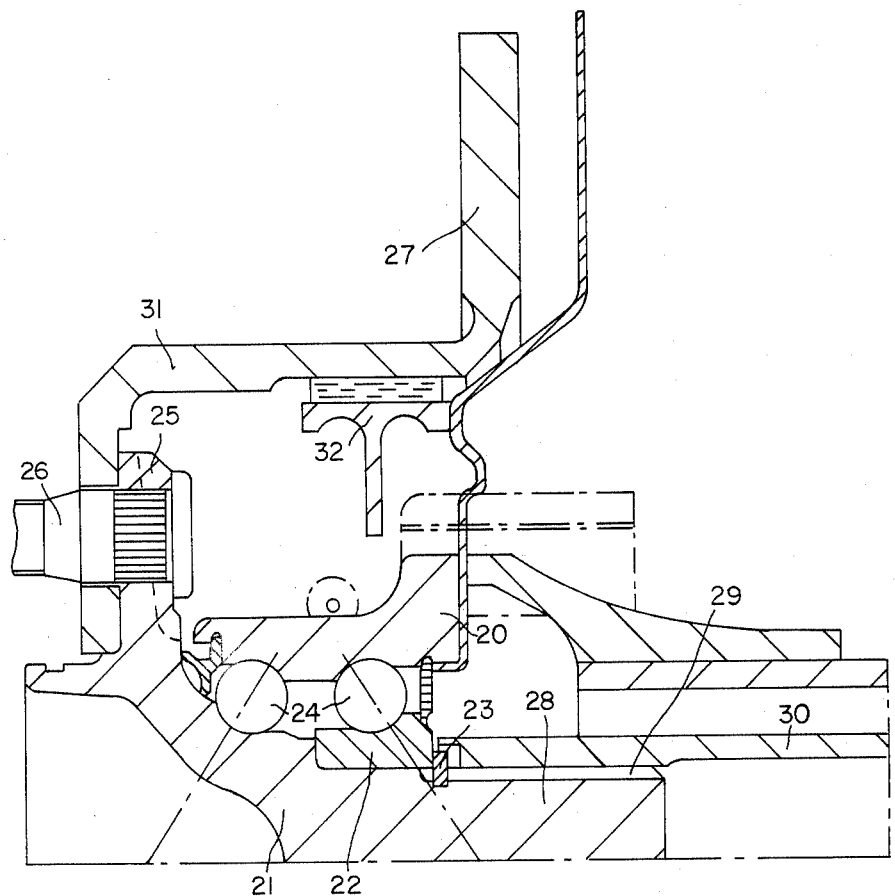
FIG. 2 shows a unit according to the invention in section.

In FIG. 2 is shown a wheel bearing unit with outer race ring 20 and inner race ring 21. The inner race ring 21 can be made in one piece, but as shown in the figure, it also can have a non-integral race 22, which is attached with proper means, in the present case a ring 23. Between outer and inner rings there are provided two rows of balls 24 at suitable spaces from each other, thus that moment stresses can be absorbed.

The inner race ring at one end is designed with a flange 25 through which extend bolts 26. These bolts are at one hand intended for attachment of the wheel, and on the other hand for attachment of the brake disc 27.

As can be seen from the figure the unit has been made very compact in the radial direction. This has been possible due to the fact that a projecting portion 28 has been provided on the inner race ring, which projecting portion is intended for mounting the unit to a drive joint. The portion 28 in the present case is equipped with splines 29, which cooperate with corresponding internal splines on the tubular drive shaft 30.

Due to the fact that it has been possible to make the unit radially compact with aid of the projecting portion 28, then it has been obtained space inside the drum-shaped portion 31 of the brake disc 27 for the parking brake 32. The parking brake 32 for the sake of clarity has been shown with its outer part only, as the other parts of the parking brake are well known and conventional parts.

Figure 3:
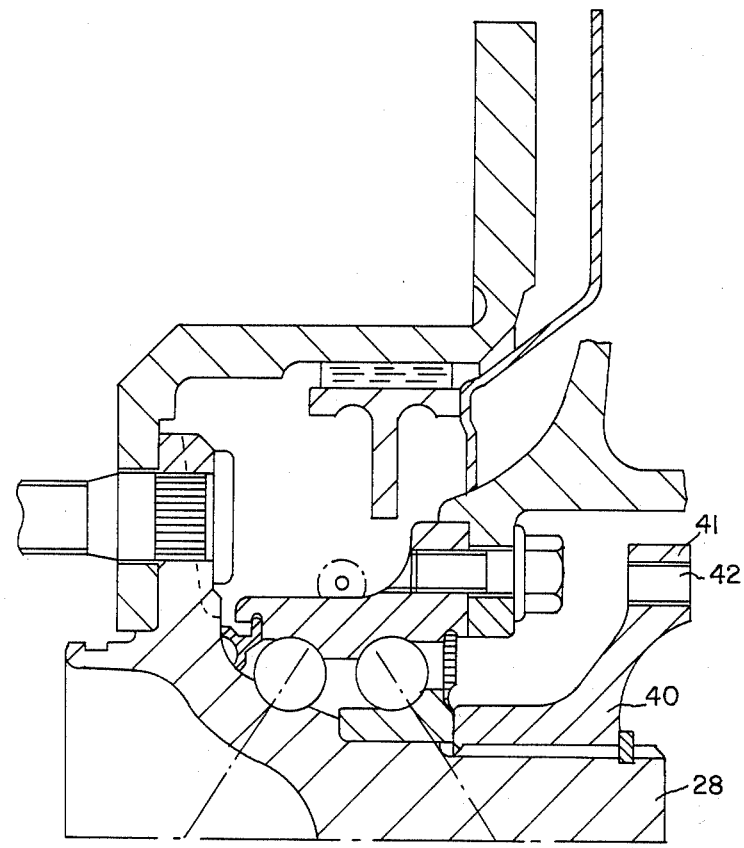
FIG. 3 shows a modification of the design according to FIG. 2, also in section.

FIG. 3 shows a device resembling to that of FIG. 2 but for a driven, articulated rear shaft. The difference is mainly that an intermediate piece 40 has been arranged upon the projecting portion 28.

This intermediate piece is provided with a flange 41 with holes 42 for bolts. By means of this intermediate piece, it is possible to connect one part of a drive joint to the projecting portion 28.

The invention is not limited to the embodiments shown but can be modified in different manners within the scope of the claims.

What is claimed is:

1. A wheel bearing unit incorporating outer race ring (20) having an outer raceway and means for attachment of the unit to a vehicle, inner race ring (21) having an inner raceway and incorporating a flange or the like for direct mounting of wheel and brake disc, and rolling bodies (24) arranged between raceways of said rings, said inner race ring (21) having a projecting portion (28) extending axially from said inner ring to one side of said raceways, attachment means on the outer surface of said projection for attaching a drive joint intended for attachment of the inner race ring to a drive shaft (30), said projecting portion (28) being integral with the inner race ring (21) and projecting axially rearwardly therefrom to facilitate assembly of a drive joint to the projecting portion in radial overlying relation.

2. A wheel bearing unit according to claim 1, characterized therein, that the projecting portion (28) is provided with splines (29).

3. A wheel bearing unit according to claim 1, characterized therein, that the projecting portion (28) in cross-section has a non-round shape, such as a triangle, a square, an ellipse or the like.

4. A wheel bearing unit according to claim 1 characterized therein, that the projecting portion (28) is made integral with the inner race ring (21).

5. A wheel bearing unit according to claim 1, characterized therein, that the projecting portion (28) is connected to a drive joint.

6. A wheel bearing unit according to claim 1, characterized therein, that the projecting portion (28) is made integral with one part of a drive joint.

7. A wheel bearing unit as claimed in claim 1, wherein said drive joint circumscribes the extension (28) and abutsthe element (23).

* * * * *

UNITED STATES PATENT AND TRADEMARK OFFICE
CERTIFICATE OF CORRECTION

PATENT NO. : 4,786,115

DATED : November 22, 1988

INVENTOR(S) : Asberg

It is certified that error appears in the above-identified patent and that said Letters Patent is hereby corrected as shown below:

Title page:

[75] Inventor: Sture Asberg, Vastra Frolunda, Sweden

Signed and Sealed this

Eighteenth Day of April, 1989

*Attest:*

DONALD J. QUIGG

*Attesting Officer*  *Commissioner of Patents and Trademarks*